(12) United States Patent
Harding

(10) Patent No.: US 10,137,978 B2
(45) Date of Patent: Nov. 27, 2018

(54) FOLDING WING TIP DEVICE WITH ROTATABLE LOCK

(71) Applicant: AIRBUS OPERATIONS LIMITED, Bristol (GB)

(72) Inventor: Matt Harding, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 306 days.

(21) Appl. No.: 15/152,765

(22) Filed: May 12, 2016

(65) Prior Publication Data

US 2016/0332722 A1    Nov. 17, 2016

(30) Foreign Application Priority Data

May 15, 2015   (GB) .................................. 1508421.3

(51) Int. Cl.
  *B64C 3/56*     (2006.01)
  *B64C 23/06*    (2006.01)

(52) U.S. Cl.
  CPC .............. *B64C 3/56* (2013.01); *B64C 23/072* (2017.05); *Y02T 50/164* (2013.01)

(58) Field of Classification Search
  CPC ....... B64C 3/56; B64C 23/065; B64C 23/069; B64C 23/072; B64C 9/00; B64C 1/26; Y02T 50/164
  See application file for complete search history.

(56) References Cited

U.S. PATENT DOCUMENTS

| | | | |
|---|---|---|---|
| 4,979,700 A * | 12/1990 | Tiedeman | B64C 13/34 244/198 |
| 5,201,479 A | 4/1993 | Renzelmann | |
| 5,379,969 A | 1/1995 | Marx et al. | |
| 5,558,299 A | 9/1996 | Veile | |
| 7,600,297 B2 * | 10/2009 | Gitnes | B64C 3/56 16/331 |
| 8,876,473 B2 * | 11/2014 | Westergaard | F03D 1/065 416/23 |

(Continued)

FOREIGN PATENT DOCUMENTS

| | | | | |
|---|---|---|---|---|
| EP | 2727828 A2 | 5/2014 | | |
| EP | 2730500 A2 | 5/2014 | | |
| EP | 2730500 A2 * | 5/2014 | | B64C 3/56 |

OTHER PUBLICATIONS

Search Report dated Nov. 12, 2015 in Great Britain Application No. GB1508421.3.

(Continued)

*Primary Examiner* — Assres H Woldemaryam
(74) *Attorney, Agent, or Firm* — Nixon & Vanderhye P.C.

(57) ABSTRACT

The invention relates to a locking mechanism for a folding wing tip. The locking mechanism has a locked configuration, in which a first part is received in a second part such that the first part may not be withdrawn from the second part along the longitudinal axis of the locking mechanism, and an unlocked configuration, in which the first part is received in the second part such that the first part may be withdrawn from the second part along the longitudinal axis of the locking mechanism, wherein the locking mechanism is moved between the locked configuration and the unlocked configuration by rotation of at least one of the first part or second part around the longitudinal axis of the locking mechanism.

14 Claims, 6 Drawing Sheets

(56) References Cited

U.S. PATENT DOCUMENTS

2007/0152098 A1 7/2007 Sheahan, Jr. et al.
2013/0313356 A1 11/2013 Santini et al.
2015/0298793 A1* 10/2015 Fox .................... B64C 23/072
　　　　　　　　　　　　　　　　　　244/49

OTHER PUBLICATIONS

Search Report dated Oct. 10, 2016 in European Application No. EP 16169547.3.

* cited by examiner

FOLDING WING TIP DEVICE WITH ROTATABLE LOCK

RELATED APPLICATIONS

The present application claims priority from Great Britain Application Number 1508421.3, filed May 15, 2015, the disclosure of which is hereby incorporated by reference herein in its entirety.

BACKGROUND OF THE INVENTION

There is a trend towards increasingly large passenger aircraft, for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage).

Therefore, folding wing tip devices have been introduced into passenger aircraft, where a wing tip device is movable between a flight configuration for use during flight, and a ground configuration for use during ground-based operations. In the ground configuration, the wing tip device is moved away from the flight configuration such that the span of the aircraft wing is reduced, thereby allowing use of existing gates and safe taxiway usage.

In order to securely fasten the folding wing tip device in the flight configuration, one or more locking mechanisms must be used. However, conventional locking mechanisms may not provide the secure fastening required for a folding wing tip. In particular, wear in a locking mechanism may result in there being play between the wing tip device and the fixed wing of the aircraft when in the flight configuration. Play may add to wear in the connection between the wing tip device and the fixed wing. Alternatively or additionally, play in the wing tip device may result in vibrations travelling down the fixed wing to the aircraft fuselage. It may also be desirable to be able to transfer loads between the wing tip device and the fixed wing in various different directions. Conventional locking mechanisms, for example lugs and pins or hooks, may not be able to provide the desired load bearing capability.

The present invention seeks to mitigate the above-mentioned problems. Alternatively or additionally, the present invention seeks to provide an improved wing tip device and locking mechanism.

SUMMARY OF THE INVENTION

The present invention provides according to a first aspect, an aircraft comprising an aircraft wing, the aircraft wing comprising a fixed wing and a wing tip device at the tip thereof, wherein the wing tip device is configurable between: (i) a locked flight configuration for use during flight and (ii) a ground configuration for use during ground-based operations, in which ground configuration the wing tip device is moved away from the locked flight configuration such that the span of the aircraft wing is reduced, the aircraft wing further comprising a locking mechanism for locking the folding wing tip device in the locked flight configuration, the locking mechanism having a longitudinal axis and comprising a first part associated with one of the fixed wing and the wing tip device, and a second part associated with the other of the fixed wing and wing tip device, the locking mechanism having a locked configuration, in which the first part is received in the second part such that the first part is prevented from being withdrawn from the second part along the longitudinal axis of the locking mechanism, and an unlocked configuration, in which the first part is received in the second part such that the first part is free to be withdrawn from the second part along the longitudinal axis of the locking mechanism, wherein the locking mechanism is moved between the locked configuration and the unlocked configuration by rotation of at least one of the first part or second part around the longitudinal axis of the locking mechanism.

When the locking mechanism is in the locked configuration, the first part and second part are configured such that an element of the first part obstructs the movement of an element of the second part in a longitudinal direction, thereby meaning that the first part may not be withdrawn from the second part. The invention as described above may provide a locking mechanism, which when in the locked configuration, is capable of bearing loads in various different directions, for example, shear loads and applied end loads acting to try to pull the locking mechanism in the direction of the longitudinal axis of the locking mechanism.

The skilled person will appreciate that the longitudinal axis of the locking mechanism is the direction in which the first part and second part are moved in order to bring the locking mechanism together and apart. The skilled person will appreciate that the longitudinal axis of the locking mechanism is not necessarily along the same direction as the longest part of the locking mechanism. For example, when in the locked configuration, the width of the locking mechanism perpendicular to the longitudinal axis of the locking mechanism may be greater than the length of the locking mechanism in the same direction as the longitudinal axis.

The first part may be a male locking pin with a longitudinal axis shared with the locking mechanism, with one or more flanges extending in a direction perpendicular to the longitudinal axis of the locking pin. The second part may be a female receiving portion, with an opening aperture shaped to allow passage of the male locking pin in a longitudinal direction when the locking mechanism is in the unlocked configuration. The female receiving portion may comprise at least one internal receiving chamber, the receiving chamber arranged to receive a flange of the male locking pin and prevent longitudinal movement of the male locking pin when the locking mechanism is in the locked configuration. The flange of the male locking pin may be moved into and out of the internal receiving chamber by rotational movement of at least one of the male locking pin and female receiving member around the longitudinal axis of the locking mechanism.

The internal receiving chamber may decrease in dimensions in the direction of rotation of the male locking pin when moving into the locked configuration. Such a reduction in dimensions may result in the flange of the male locking pin binding against one or more surfaces which define the internal receiving chamber, when the locking mechanism is in the locked configuration. Such an arrangement may provide a locking mechanism that securely fastens in the locked configuration, with little or no movement of the locking mechanism along the longitudinal direction possible in the locked configuration.

The male locking pin may comprise two, three, four, or five flanges extending in a direction perpendicular to the longitudinal axis of the locking pin. The female receiving portion may comprise a corresponding number of internal receiving chambers, each chamber arranged to receive one of the flanges when the locking mechanism is in the locked configuration. The female receiving portion may comprise an opening aperture with two, three, four, or five sections shaped to correspond to, and allow passage of, the flanges extending from the male locking pin.

The female receiving portion may comprise one or more internal receiving chambers with at least a partial thread. The thread may act on the corresponding flange or flanges extending from the male locking pin such that rotation of the male locking pin or female receiving portion into the locked configuration pulls the male locking pin and the female receiving portion into each other in a longitudinal direction, thereby tightening, and preloading the locking mechanism when in the locked configuration. Such an arrangement may compensate for wear in the first part and/or second part.

The first part and/or second part may include a toothed surface suitable for being driven by a similarly toothed drive unit. Such an arrangement may be used to rotate the first part and/or second part, and move the locking mechanism between the locked and unlocked configurations. The movement of the locking mechanism between the locked configuration and unlocked configuration may be controlled by a control unit.

The first part may comprise a male locking pin comprising one or more locking channels. The second part may comprise one or more internal pins arranged to engage with a corresponding locking channel. The one or more locking channels may extend initially in a longitudinal direction and then in a direction perpendicular to the longitudinal direction. In order to lock the locking mechanism in the locked configuration, the male locking pin may be moved into the second part such that the locking pins slide along the locking channels. Once the locking pins come to the end of the longitudinal section of the locking channels, the male locking pin or second part may be rotated so that the locking pin moves along the locking channel perpendicular to the longitudinal section of the channel. When rotated in this way, the fact that the locking channel engaged with the pin runs perpendicular to the longitudinal axis means the male locking pin may not be withdrawn from the second part in a longitudinal direction. To move the locking mechanism from the locked configuration to the unlocked configuration, the male locking pin and/or second part is rotated in the opposite direction to the locking rotation, moving the locking pin from the perpendicular part of the locking channel to the longitudinal part of the locking channel. The male locking pin may then be withdrawn from the second part by withdrawing the male locking pin in the longitudinal direction.

The wing tip device may be a wing tip extension; for example the wing tip device may be a planar tip extension. In other embodiments, the wing tip device may comprise, or consist of, a non-planar device, such as a winglet. In the flight configuration the trailing edge of the wing tip device is preferably a continuation of the trailing edge of a fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the fixed wing and wing tip device. However, there are preferably no discontinuities at the junction between the fixed wing and wing tip device. The upper and the lower surfaces of the wing tip device may be continuations of the upper and lower surfaces of the fixed wing.

When the wing tip device is in the ground configuration, the aircraft may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

According to a second aspect of the invention there is also provided an aircraft wing, the aircraft wing comprising a fixed wing and a wing tip device at the tip thereof, wherein the wing tip device is configurable between: (i) a locked flight configuration for use during flight and (ii) a ground configuration for use during ground-based operations, in which ground configuration the wing tip device is moved away from the locked flight configuration such that the span of the aircraft wing is reduced, the aircraft wing further comprising a locking mechanism for locking the folding wing tip device in the locked flight configuration, the locking mechanism having a longitudinal axis and comprising a first part associated with one of the fixed wing and the wing tip device, and a second part associated with the other of the fixed wing and wing tip device, the locking mechanism having a locked configuration, in which the first part is received in the second part such that the first part is prevented from being withdrawn from the second part along the longitudinal axis of the locking mechanism, and an unlocked configuration, in which the first part is received in the second part such that the first part is free to be withdrawn from the second part along the longitudinal axis of the locking mechanism, wherein the locking mechanism is moved between the locked configuration and the unlocked configuration by rotation of at least one of the first part or second part around the longitudinal axis of the locking mechanism.

According to a third aspect, the invention provides a method of locking a wing tip device on an aircraft according to the first aspect of the invention, the method comprising the steps of moving the wing tip device into the flight configuration, such that the first part is received within the second part of the locking mechanism, and rotating the first part and/or second part relative to the longitudinal axis of the locking mechanism such that corresponding elements of the first part and second part obstruct each other, thereby preventing relative movement of the first part and second part in the longitudinal direction.

According to a fourth aspect, the invention provides a method of unlocking a wing tip device on an aircraft according to the first aspect of the invention, the method comprising the steps of rotating the first part and/or second part relative to the longitudinal axis of the locking mechanism such that corresponding elements of the first part and second part do not obstruct each other, thereby allowing relative movement of the first part and second part in the longitudinal direction.

According to a fifth embodiment of the invention, there is provided a locking mechanism, the locking mechanism comprising a first part and a second part, the locking mechanism having a locked configuration, in which the first part is received in the second part such that the first part is prevented from being withdrawn from the second part along a longitudinal axis of the locking mechanism, and an unlocked configuration, in which the first part is received in the second part such that the first part is free to be withdrawn from the second part along the longitudinal axis of the locking mechanism, wherein the locking mechanism is moved between the locked configuration and the unlocked configuration by rotation of at least one of the first part or second part around the longitudinal axis of the locking mechanism.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
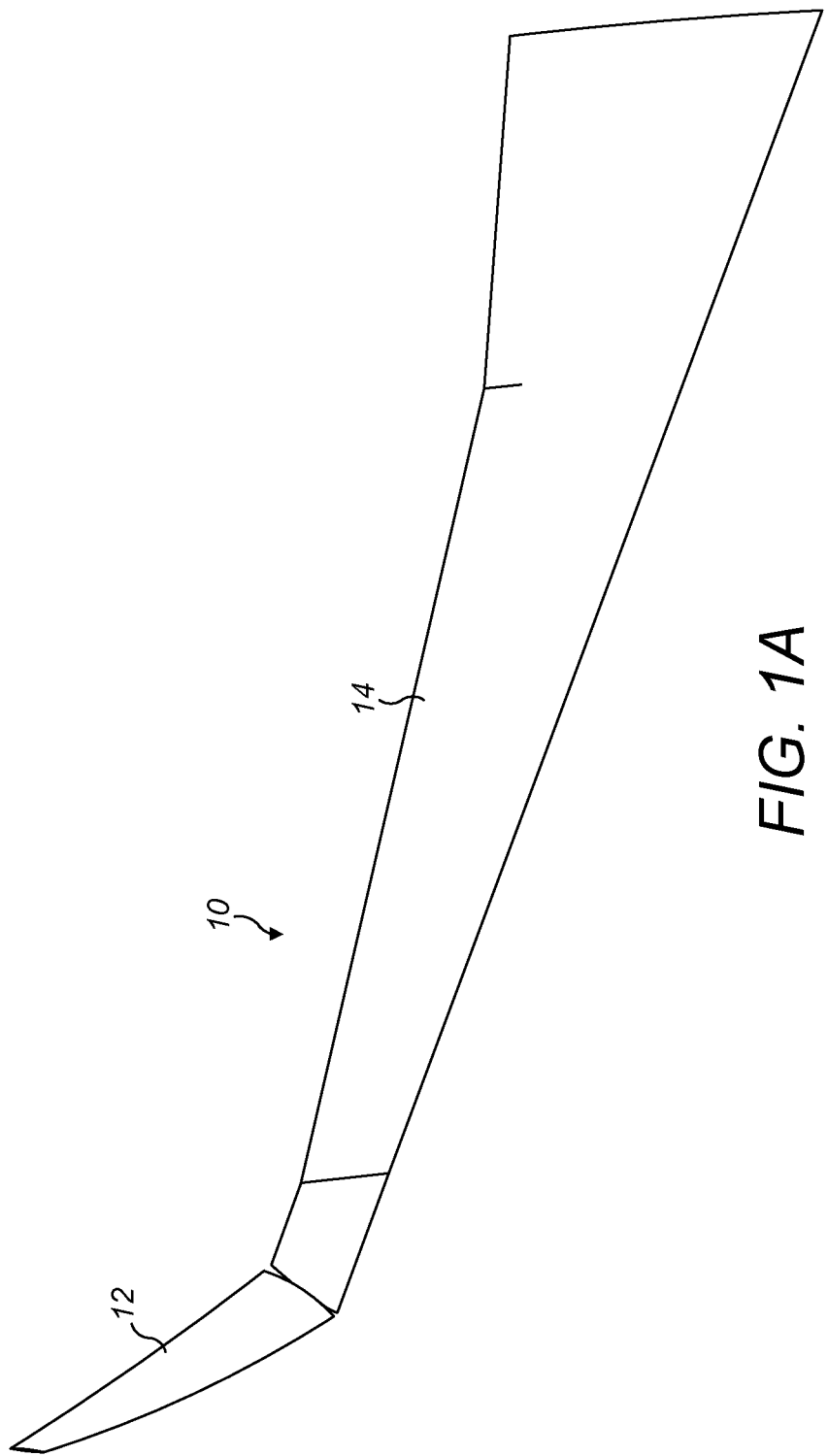
FIG. 1A shows a schematic view of a wing according to a first embodiment of the invention.
Figure 1B:
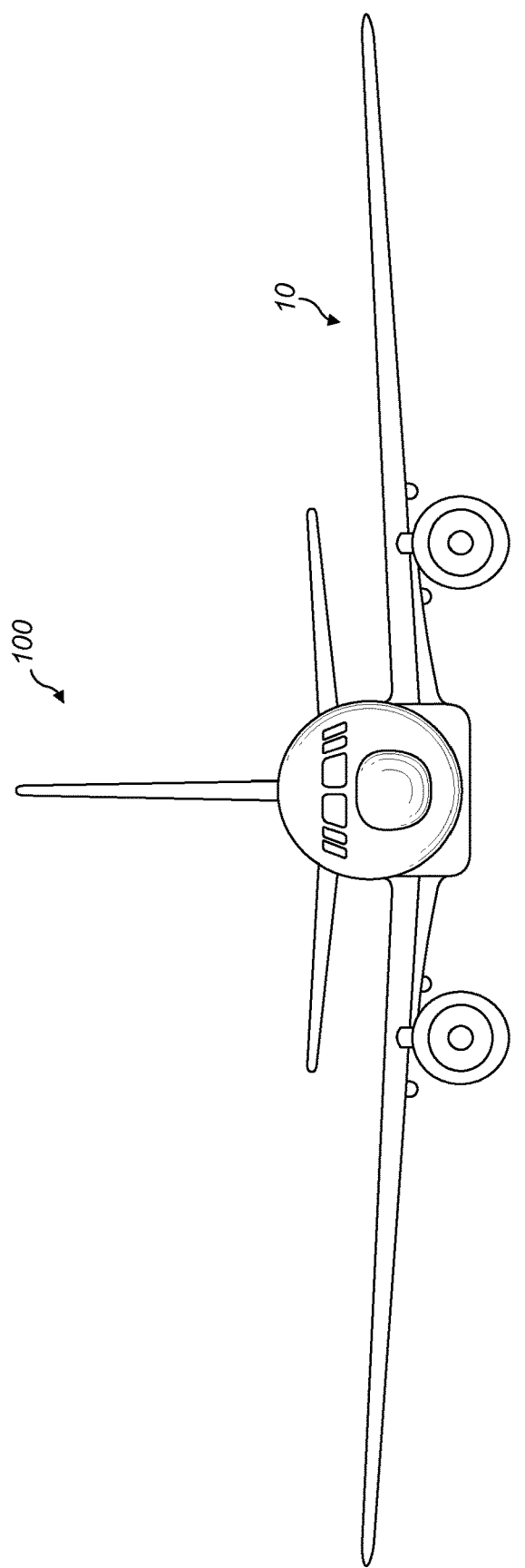
FIG. 1B shows a schematic view of an aircraft comprising a wing as shown in FIG. 1A

FIG. 1A shows a wing 10 comprising a wing tip device 12 and a fixed wing 14. FIG. 1B shows an aircraft 100 comprising the wing 10. The wing tip device 12 is configurable between: (i) a locked flight configuration for use during flight and (ii) a ground configuration for use during ground-based operations, in which ground configuration the wing tip device 12 is moved away from the locked flight configuration such that the span of the aircraft wing 10 is reduced. FIG. 1A shows the wing tip device 12 in the ground configuration and FIG. 1B shows the wing tip device in the locked flight configuration.

Figure 2:
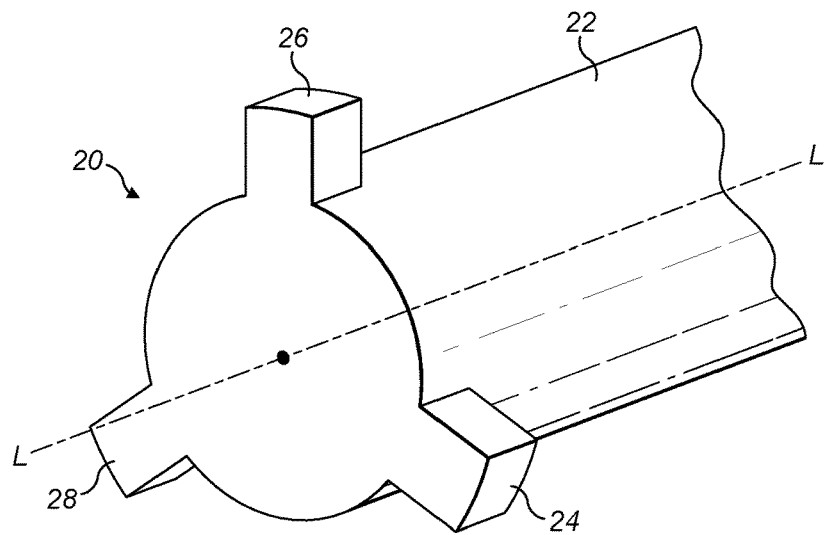
FIG. 2 shows a schematic view of a first part of a locking mechanism according to a first embodiment of the invention.
Figure 3:
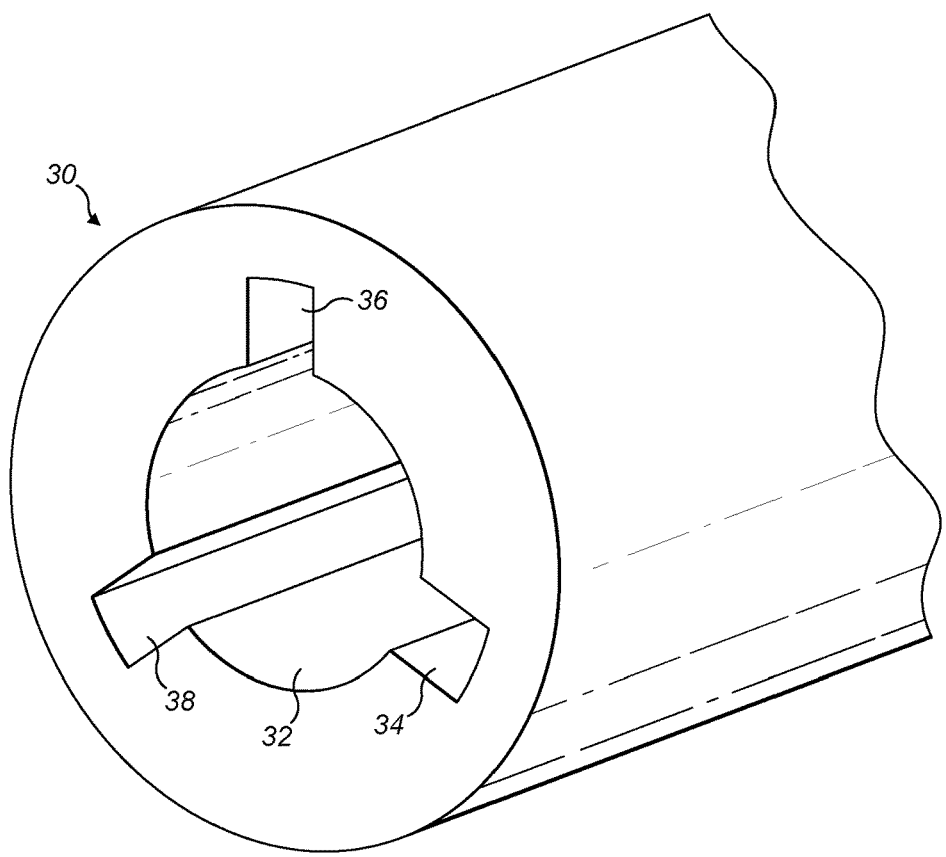
FIG. 3 shows a schematic view of a second part of a locking mechanism according to the first embodiment of the invention.
Figure 4:
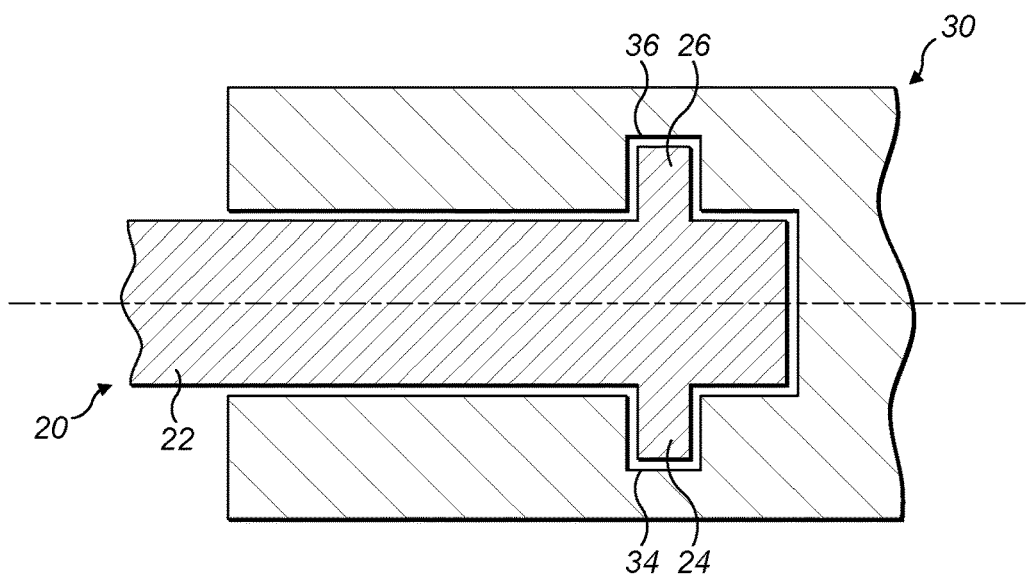
FIG. 4 shows a cross sectional view of the locking mechanism according to the first embodiment of the invention in the locked configuration.
Figure 5:
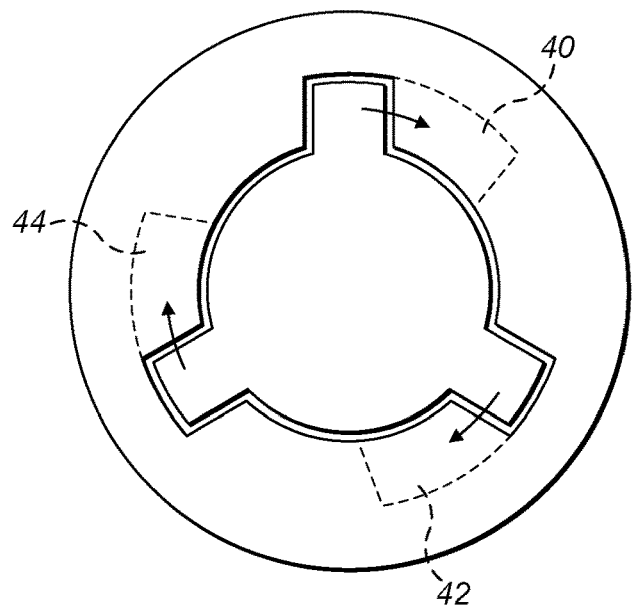
FIG. 5 shows a cross sectional view of the locking mechanism according to the first embodiment of the invention in the unlocked configuration.
Figure 6:
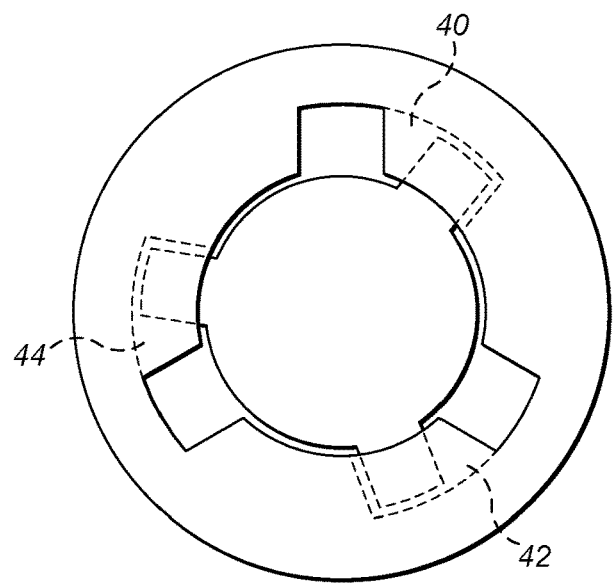
FIG. 6 shows a cross sectional view of the locking mechanism according to the first embodiment of the invention in the locked configuration.

FIG. 2 shows a first part 20 of a locking mechanism, the locking mechanism present on a wing 10 as shown in FIG. 1. The first part comprises a male locking pin 22 with a three flanges 24, 26, and 28, which extend from the outer surface of the male locking pin 22 in a direction perpendicular to the longitudinal axis indicated by the letters L-L. FIG. 3 shows a second part 30 of a locking mechanism. The second part 30 includes an opening with a central aperture 32 shaped to allow passage of the male locking pin 22 in the longitudinal direction. The opening also includes outer apertures 34, 36, and 38 which correspond in approximate size and position relative to the central aperture 32 as the flanges 24, 26, and 28 to the locking pin 22. The second part 30 includes three internal chambers 40, 42, and 44, as shown in FIGS. 4, 5, and 6.

The first part 20 is associated with the wing tip device 12, and the second part 30 is associated with the fixed wing 14. When the wing tip device 12 is moved from the ground configuration to the flight configuration the first part 20 is moved from a position away from the second part 30, to a position where the first part 20 is inserted into the second part 30, such that the male locking pin 22 including the flanges 24, 26, and 28, passes through the central aperture 32, and outer apertures 34, 36, and 38, in a longitudinal direction. In this position, the first part and second part of the locking mechanism are engaged, but in the unlocked configuration, as shown in FIG. 5. In this position, the first part 20 may still be removed from the second part 30, by moving the two parts away from each other in the longitudinal direction. In order to move the locking mechanism into the locked configuration, at least one of the first part 20 and second part 30 is rotated such that the flanges 24, 26, 28, move into the corresponding internal chambers 40, 42, 44. The locked configuration is shown in both FIGS. 4 and 6. Once the locking mechanism is in the locked configuration, the internal chambers 40, 42, and 44, obstruct the removal of the first part from the second part in the longitudinal direction. Therefore, wing tip device 12 is then in the locked flight configuration and suitable for flight. In order to move the locking mechanism to the unlocked configuration, so that the wing tip device 12 may be moved to the ground configuration, at least one of the first part and second part is rotated such that the flanges 24, 26, and 28, are not obstructed by the internal chambers 40, 42, 44, and may be withdrawn by longitudinal movement along the outer apertures 34, 36, 38.

At least one of the first part and second part may include a toothed outer surface. The toothed outer surface may be driven by a toothed drive unit, in order to rotate the first part or second part, thereby moving the locking mechanism between the locked configuration and unlocked configuration.

Figure 7:
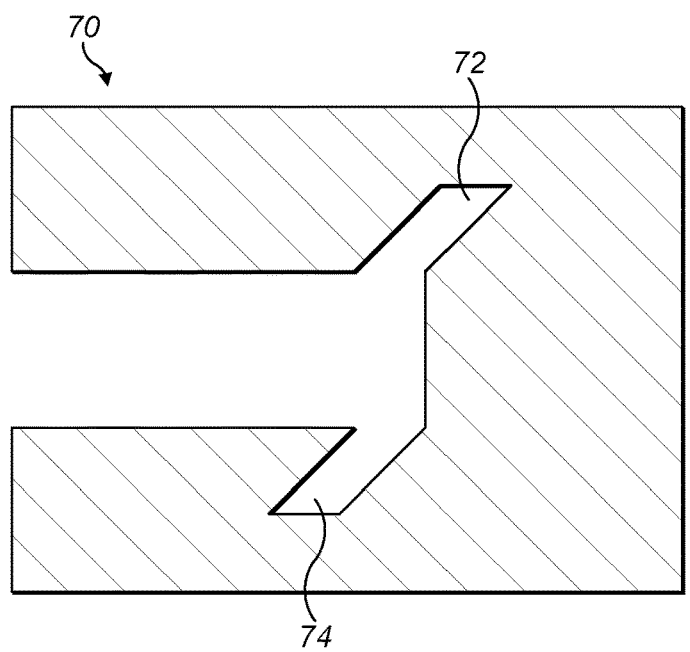
FIG. 7 shows a second embodiment of the invention with a threaded female receiving portion.

FIG. 7 shows a second embodiment of the invention, where the second part 70 includes internal chambers 72, 74, and a third internal chamber (not shown), with a threaded orientation. The first part corresponds with the first part as described with respect to the first embodiment of the invention, so will not be described separately again. The thread within the chambers 72, 74, means that as the first part or second part is rotated to move the locking mechanism into the locked configuration, the thread acts on the first part to pull in the longitudinal direction, thereby tightening the connection between the first part 20 and the second part 70. This may provide a more secure locking mechanism. The thread may also act to compensate for any wear in the first part and second part by preloading the locking mechanism as the first part 20 and second part 70 are tightened together.

Figure 8:
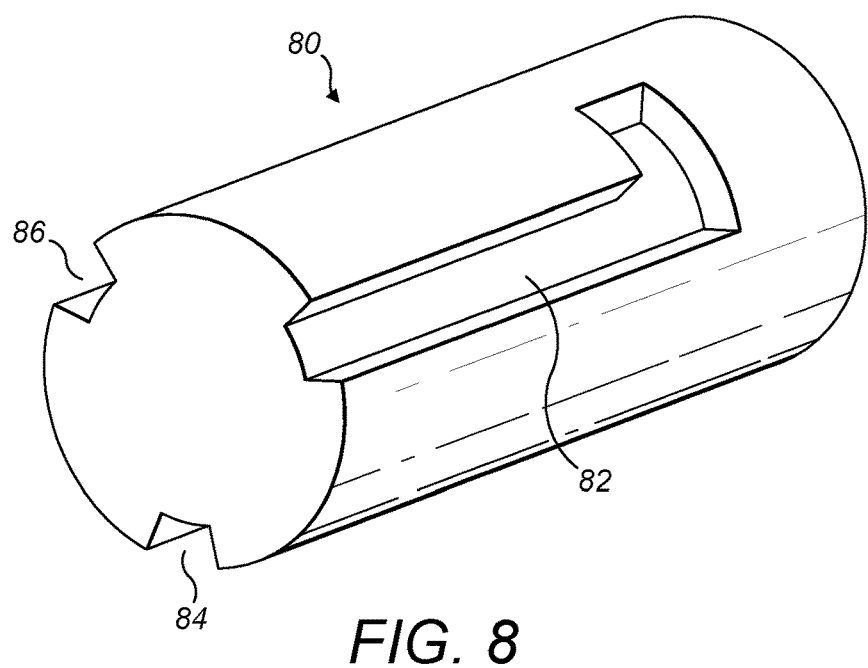
FIG. 8 shows a male locking pin according to a third embodiment of the invention.
Figure 9:
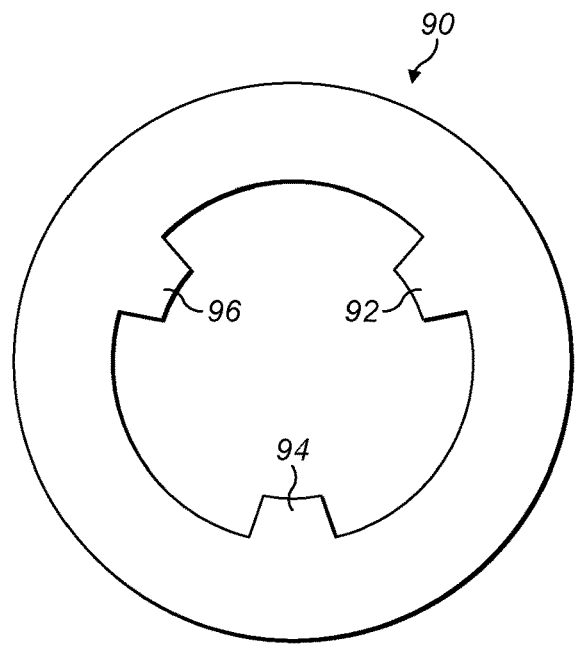
FIG. 9 shows a female receiving portion according to the third embodiment of the invention.

FIG. 8 shows a male locking pin 80 with locking channels 82, 84, 86, located in the outer surface of the male locking pin. FIG. 9 shows a cross section of a female receiving portion 90 which includes a number of pins 92, 94, 96, to engage with the corresponding locking channels.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The flanges extending from the male locking member may be tapered. The tapered flanges may be oriented such that rotating the male locking member into the locked configuration tightens the engagement between the male locking member and the female receiving portion.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft, comprising:
an aircraft wing, the aircraft wing comprising a fixed wing and a wing tip device at the tip thereof, wherein the wing tip device is configurable between:
(i) a locked flight configuration for use during flight and (ii) a ground configuration for use during ground-based operations, in which ground configuration the wing tip device is moved away from the locked flight configuration such that the span of the aircraft wing is reduced, the aircraft wing further comprising a locking mechanism for locking the wing tip device in the locked flight configuration, the locking mechanism having a longitudinal axis and comprising a first part associated with one of the fixed wing and the wing tip device, and a second part associated with the other of the fixed wing and wing tip device,
the locking mechanism having a locked configuration, in which the first part is received in the second part such that the first part is prevented from being withdrawn from the second part along the longitudinal axis of the locking mechanism, and an unlocked configuration, in which the first part is received in the second part such that the first part is free to be withdrawn from the second part along the longitudinal axis of the locking mechanism, wherein the locking mechanism is moved between the locked configuration and the unlocked configuration by rotation of at least one of the first part or second part around the longitudinal axis of the locking mechanism,
wherein the first part is a male locking pin having a longitudinal axis shared with the locking mechanism, with one or more flanges extending in a direction perpendicular to the longitudinal axis of the locking pin,
wherein the second part is a female receiving portion, with an opening aperture shaped to allow passage of the male locking pin in a longitudinal direction when the locking mechanism is in the unlocked configuration, and
wherein the female receiving portion comprises at least one internal receiving chamber, the receiving chamber arranged to receive a flange of the male locking pin and prevent longitudinal movement of the male locking pin when the locking mechanism is in the locked configuration.

2. The aircraft as claimed in claim 1, wherein the flange of the male locking pin is configured to be moved into and out of the internal receiving chamber by rotational movement of at least one of the male locking pin and female receiving member around the longitudinal axis of the locking mechanism.

3. The aircraft as claimed in claim 1, wherein the internal receiving chamber decreases in dimensions in the direction of rotation of the male locking pin when moving into the locked configuration.

4. The aircraft as claimed in claim 1, wherein the male locking pin comprises two, three, four, or five flanges extending in a direction perpendicular to the longitudinal axis of the locking pin.

5. The aircraft as claimed in claim 4, further comprising a female receiving portion comprising a corresponding number of internal receiving chambers, each chamber arranged to receive individual flanges when the locking mechanism is in the locked configuration.

6. The aircraft as claimed in claim 5, wherein the female receiving portion comprises an opening aperture with two, three, four, or five sections shaped to correspond to, and allow passage of, the flanges extending from the male locking pin.

7. The aircraft as claimed in claim 1, wherein the female receiving portion comprises one or more internal receiving chambers with at least a partial thread.

8. The aircraft as claimed in claim 1, wherein the first part and/or second part includes a toothed surface suitable for being driven by a similarly toothed drive unit.

9. The aircraft as claimed in claim 1, wherein the first part comprises a male locking pin comprising one or more locking channels.

10. The aircraft as claimed in claim 9, wherein the second part comprises one or more internal pins arranged to engage with a corresponding locking channel.

11. The aircraft as claimed in claim 9, wherein the one or more locking channels extend initially in a longitudinal direction and then in a direction perpendicular to the longitudinal direction.

12. An aircraft wing, comprising:
a fixed wing and a wing tip device at the tip thereof,
wherein the wing tip device is configurable between: (i) a locked flight configuration for use during flight and (ii) a ground configuration for use during ground-based operations, in which ground configuration the wing tip device is moved away from the locked flight configuration such that the span of the aircraft wing is reduced, the aircraft wing further comprising a locking mechanism for locking the wing tip device in the locked flight configuration, the locking mechanism having a longitudinal axis and comprising a first part associated with one of the fixed wing and the wing tip device, and a second part associated with the other of the fixed wing and wing tip device, the locking mechanism having a locked configuration, in which the first part is received in the second part such that the first part is prevented from being withdrawn from the second part along the longitudinal axis of the locking mechanism, and an unlocked configuration, in which the first part is received in the second part such that the first part is free to be withdrawn from the second part along the longitudinal axis of the locking mechanism, wherein the locking mechanism is moved between the locked configuration and the unlocked configuration by rotation of at least one of the first part or second part around the longitudinal axis of the locking mechanism, wherein the first part is a male locking pin having a longitudinal axis shared with the locking mechanism, with one or more flanges extending in a direction perpendicular to the longitudinal axis of the locking pin, wherein the second part is a female receiving portion, with an opening aperture shaped to allow passage of the male locking pin in a longitudinal direction when the locking mechanism is in the unlocked configuration, and wherein the female receiving portion comprises at least one internal receiving chamber, the receiving chamber arranged to receive a flange of the male locking pin and prevent longitudinal movement of the male locking pin when the locking mechanism is in the locked configuration.

13. A method of locking a wing tip device on an aircraft as claimed in claim 1, the method comprising the steps of moving the wing tip device into the flight configuration, such that the first part is received within the second part of the locking mechanism, and rotating the first part and/or second part relative to the longitudinal axis of the locking mechanism such that corresponding elements of the first part and second part obstruct each other, thereby preventing relative movement of the first part and second part in the longitudinal direction.

14. A method of unlocking a wing tip device on an aircraft as claimed in claim 1, the method comprising the steps of rotating the first part and/or second part relative to the longitudinal axis of the locking mechanism such that corresponding elements of the first part and second part do not obstruct each other, thereby allowing relative movement of the first part and second part in the longitudinal direction.

* * * * *